US010512932B2

(12) United States Patent
Seferi

(10) Patent No.: US 10,512,932 B2
(45) Date of Patent: Dec. 24, 2019

(54) GLUE GUN DISPENSING NOZZLE INDICATOR

(71) Applicant: Acme United Corporation, Fairfield, CT (US)

(72) Inventor: Nicholas L. Seferi, Southbury, CT (US)

(73) Assignee: Acme United Corporation, Fairfield, CT (US)

( * ) Notice: Subject to any disclaimer, the term of this patent is extended or adjusted under 35 U.S.C. 154(b) by 0 days.

(21) Appl. No.: 15/333,939

(22) Filed: Oct. 25, 2016

(65) Prior Publication Data

US 2017/0320089 A1 Nov. 9, 2017

Related U.S. Application Data

(60) Provisional application No. 62/330,986, filed on May 3, 2016.

(51) Int. Cl.
*G01K 11/12* (2006.01)
*B05C 17/005* (2006.01)

(52) U.S. Cl.
CPC .... *B05C 17/00503* (2013.01); *B05C 17/0053* (2013.01); *G01K 11/12* (2013.01)

(58) Field of Classification Search
CPC ........ G01K 11/12; G01K 11/14; G01K 11/18; G01K 13/02; B05C 17/0053; B05C 17/00503; B05C 17/00546; B05B 12/004; B65D 83/28
USPC ...... 222/146.1–146.2, 146.5, 23, 25, 28, 54; 239/71
See application file for complete search history.

(56) References Cited

U.S. PATENT DOCUMENTS

| | | | | |
|---|---|---|---|---|
| 3,827,301 A | * | 8/1974 | Parker | G01K 1/14 374/162 |
| 5,323,652 A | * | 6/1994 | Parker | G01F 23/22 73/295 |
| 6,281,165 B1 | * | 8/2001 | Cranford | A47G 19/2227 427/150 |
| 6,544,614 B1 | * | 4/2003 | Huffer | A61J 9/02 116/200 |
| 7,484,456 B2 | * | 2/2009 | Ferron | A47J 45/068 99/342 |
| 7,798,706 B2 | * | 9/2010 | LaGuardia | G01K 1/14 116/216 |

(Continued)

FOREIGN PATENT DOCUMENTS

| | | |
|---|---|---|
| DE | 000008228634 | 5/1983 |
| DE | 000069814914 | 3/2004 |

(Continued)

OTHER PUBLICATIONS

Examination Report DE102017105157.
Examination Report DE102017108909.

*Primary Examiner* — Paul R Durand
*Assistant Examiner* — Andrew P Bainbridge
(74) *Attorney, Agent, or Firm* — Alix, Yale & Ristas, LLP

(57) ABSTRACT

A glue gun dispensing nozzle indicator changes color when a heater element exceeds a transition temperature. In one embodiment, the temperature indicator changes from a blue color to a red color to indicate that the temperature is sufficient so that the glue gun may dispense molten glue. Temperature dependent color pigments are applied as coatings to the indicator.

20 Claims, 4 Drawing Sheets

(56) References Cited

U.S. PATENT DOCUMENTS

| | | | | |
|---|---|---|---|---|
| 8,722,418 | B1* | 5/2014 | Zunino, III | G01N 31/229 |
| | | | | 252/408.1 |
| 9,010,953 | B1* | 4/2015 | Wells | F21V 33/0056 |
| | | | | 362/101 |
| 9,630,767 | B2* | 4/2017 | Gantenbein | B05B 7/0018 |
| 2001/0043469 | A1* | 11/2001 | Carpenter | B44C 1/10 |
| | | | | 362/161 |
| 2002/0192005 | A1* | 12/2002 | Chang | B41J 2/14024 |
| | | | | 400/705 |
| 2004/0042172 | A1* | 3/2004 | Kusaka | G06F 1/1616 |
| | | | | 361/679.53 |
| 2004/0232165 | A1 | 10/2004 | Lee | |
| 2005/0103209 | A1* | 5/2005 | Ferron | A47J 45/068 |
| | | | | 99/422 |
| 2006/0049176 | A1* | 3/2006 | Ferron | A47J 36/02 |
| | | | | 219/621 |
| 2006/0196888 | A1* | 9/2006 | Agronin | B05C 17/0053 |
| | | | | 222/146.5 |
| 2007/0054178 | A1* | 3/2007 | Moon | H01M 2/34 |
| | | | | 429/62 |
| 2007/0280331 | A1* | 12/2007 | Lin | G01K 11/12 |
| | | | | 374/162 |
| 2008/0084915 | A1* | 4/2008 | Gluck | A47G 19/2227 |
| | | | | 374/150 |
| 2009/0010306 | A1* | 1/2009 | Egami | C09D 5/22 |
| | | | | 374/161 |
| 2009/0143516 | A1* | 6/2009 | MacDonald | A61B 5/015 |
| | | | | 524/236 |
| 2009/0306674 | A1* | 12/2009 | Chandler | A61B 17/8802 |
| | | | | 606/93 |
| 2010/0035043 | A1* | 2/2010 | Bird | G01D 5/34707 |
| | | | | 428/323 |
| 2014/0339327 | A1* | 11/2014 | Gantenbein | B05B 7/0018 |
| | | | | 239/71 |
| 2017/0199087 | A1* | 7/2017 | Bojappa | F01D 21/003 |

FOREIGN PATENT DOCUMENTS

| | | |
|---|---|---|
| DE | 102006059305 | 6/2008 |
| DE | 102007008722 | 8/2008 |
| DE | 202013007889 | 11/2014 |
| DE | 202015002318 | 6/2015 |
| DE | 202015006480 | 11/2015 |
| DE | 102017105157 | 9/2017 |
| DE | 102017003063 | 10/2017 |

* cited by examiner

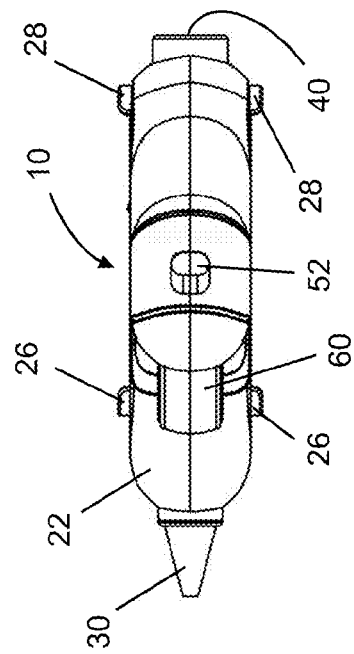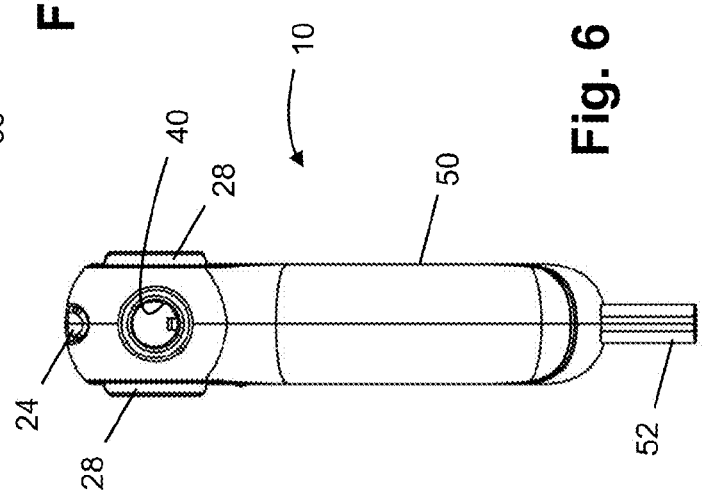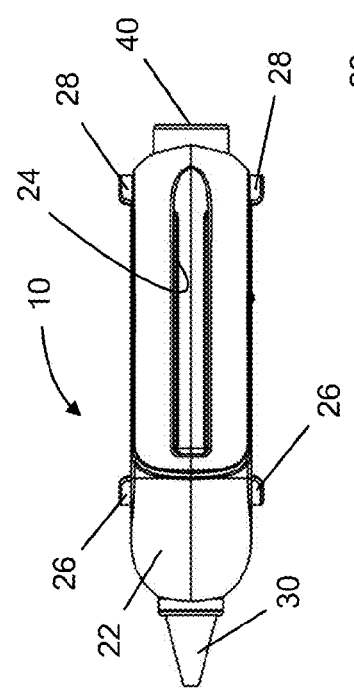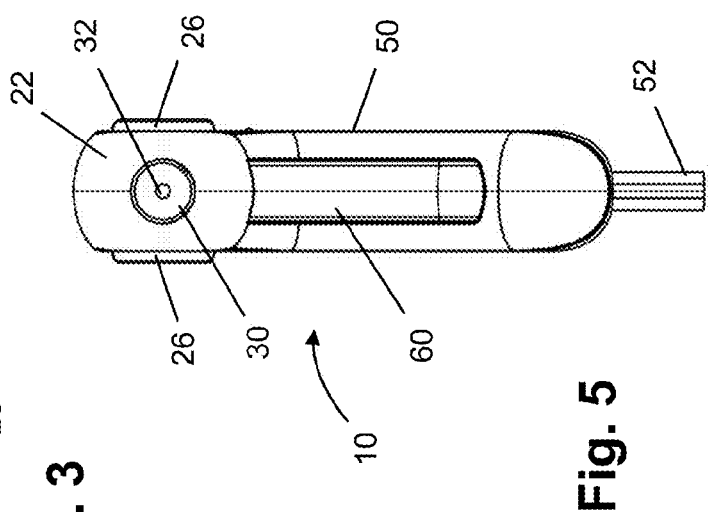

GLUE GUN DISPENSING NOZZLE INDICATOR

CROSS-REFERENCE TO RELATED APPLICATION

This application claims the priority of U.S. Provisional Patent Application No. 62/330,986 filed on May 3, 2016, the disclosure of which is incorporated herein by reference in its entirety.

BACKGROUND

This disclosure relates generally to a glue gun for crafts and other light duty applications. More particularly, this disclosure relates to a glue gun having a heater which melts a glue stick and dispenses molten glue through a dispensing nozzle.

Numerous glue guns have been commercially marketed for use in crafts and other light gluing applications. The conventional glue guns are generally characterized by having a handle which is disposed at an angle (which may be perpendicular or otherwise) to a main body housing a heater and having a forward dispensing nozzle. The heater is electrically energized and, upon attaining a sufficient temperature, melts a portion of a glue stick received in the glue gun body. The glue gun body typically has a receiver at a rear portion and defines a longitudinal channel which ultimately communicates with the dispensing nozzle. A mechanically operable trigger assembly is typically employed to advance the glue for dispensing through the nozzle tip.

Operation of the glue gun typically depends on the heater producing sufficient heat to melt the glue stick. Accordingly, the glue gun best operates when a sufficient operating temperature has been attained. Several temperature indicators have been advanced for various glue gun embodiments to indicate that a sufficient glue dispensing temperature has been attained.

SUMMARY

Briefly stated, a glue gun for dispensing glue in a preferred form comprises a body having a receiver and a dispensing nozzle. A heater is disposed in the body and is operable to heat glue at an operating temperature for dispensing glue through the nozzle. The nozzle exhibits a first color below a first transition temperature produced by the heater and changes to a second color when the transition temperature is exceeded.

The first color is preferably in the blue range and the second color is preferably in the red range. The nozzle changes back to the first color when the operating temperature decreases from greater than the transition temperature to less than the transition temperature. The nozzle has a first coating with a pigment having the second color and an outer second coating with a pigment having the first color. The transition temperature is preferably in the range from 20° C. to 100° C. In some embodiments, transition temperature is in the range from 30° C. to 70° C. In one embodiment, the transition temperature is approximately 65° C. The nozzle is coated with a temperature dependent color changing pigment.

A glue gun for dispensing glue comprises a body having a receiver for receiving a glue stick at a first end and a dispensing nozzle assembly at a second end. A heater is disposed in the body and operable to heat a glue stick to an operating temperature for dispensing molten glue through a nozzle. At least a portion of the nozzle assembly exhibits a first color below a first transition temperature produced by the heater and changes to a second color when the transition temperature is exceeded.

The first color is in the blue range and the second color is in the red range. The nozzle assembly portion changes back to the first color when the operating temperature decreases from a temperature greater than the transition temperature to less than the transition temperature. The nozzle assembly portion has a first coating with the pigment having a second color and an outer second coating with the pigment having a first color. The transition temperature is in the range of 30° C. to 70° C. and preferably approximately 65° C.

A glue gun for dispensing glue comprises a body having a receiver and a dispensing nozzle. A heater is disposed in the body and is operable to heat glue to an operating temperature for dispensing through the nozzle. The glue gun also has a temperature indicator for the heater. The temperature indicator exhibits a first color below a first transition temperature produced by the heater and changes to a second color when the transition temperature is exceeded.

The first color is preferably in the blue range and the second color is in the red range. The temperature indicator exhibits a first color when the temperature decreases from greater than the transition temperature to less than the transition temperature. The indicator has a surface having a first coating with the pigment having the second color and an outer second coating with the pigment having the first color. The temperature indicator comprises a temperature dependent color changing pigment.

BRIEF DESCRIPTION OF THE DRAWINGS

FIG. 3 is a top plan view of the glue gun of FIG. 1;

FIG. 4 is a bottom plan view of the glue gun of FIG. 1;

FIG. 5 is a forward end view of the glue gun of FIG. 1;

FIG. 6 is a rear end view of the glue gun of FIG. 1; and

DETAILED DESCRIPTION

Figure 1:
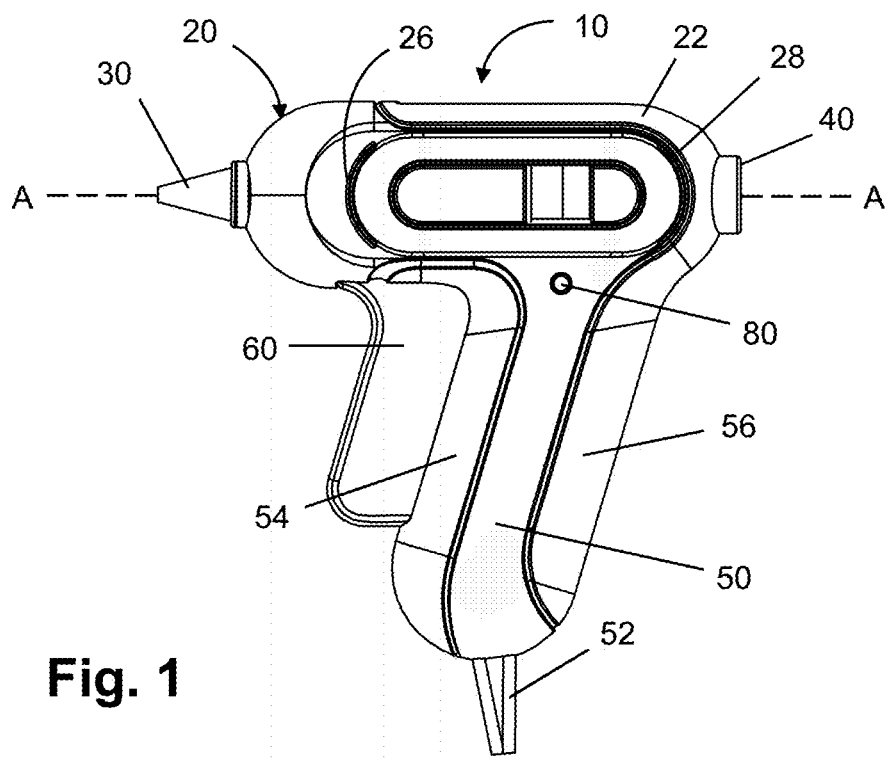
FIG. 1 is a side elevational view of a representative glue gun, partially illustrated in schematic with a partially illustrated connected cord.
Figure 2:
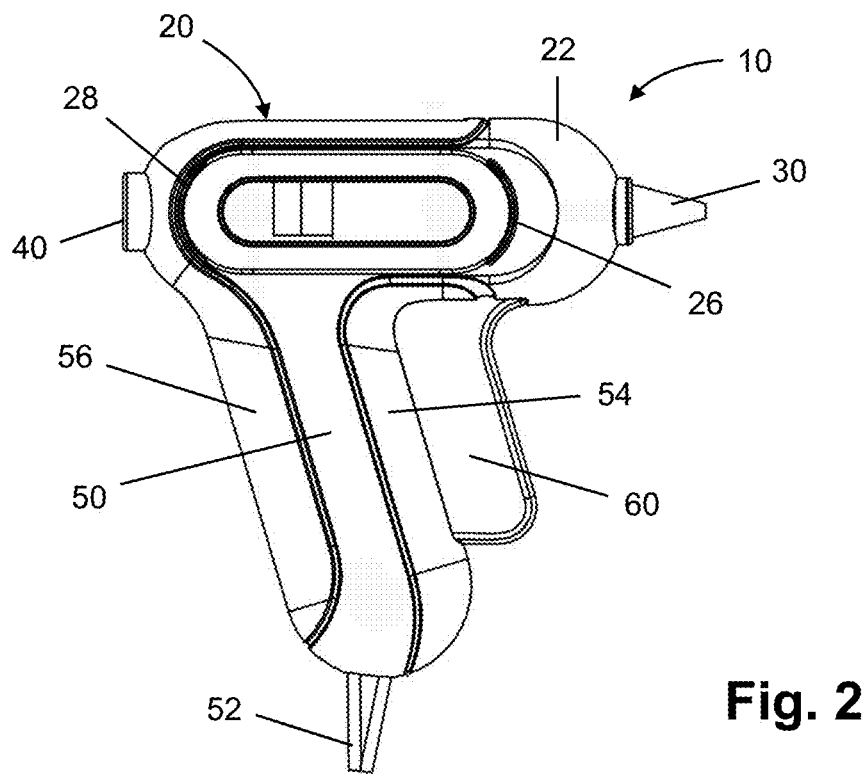
FIG. 2 is an opposite side view of the glue gun of FIG. 1.
Figure 7:
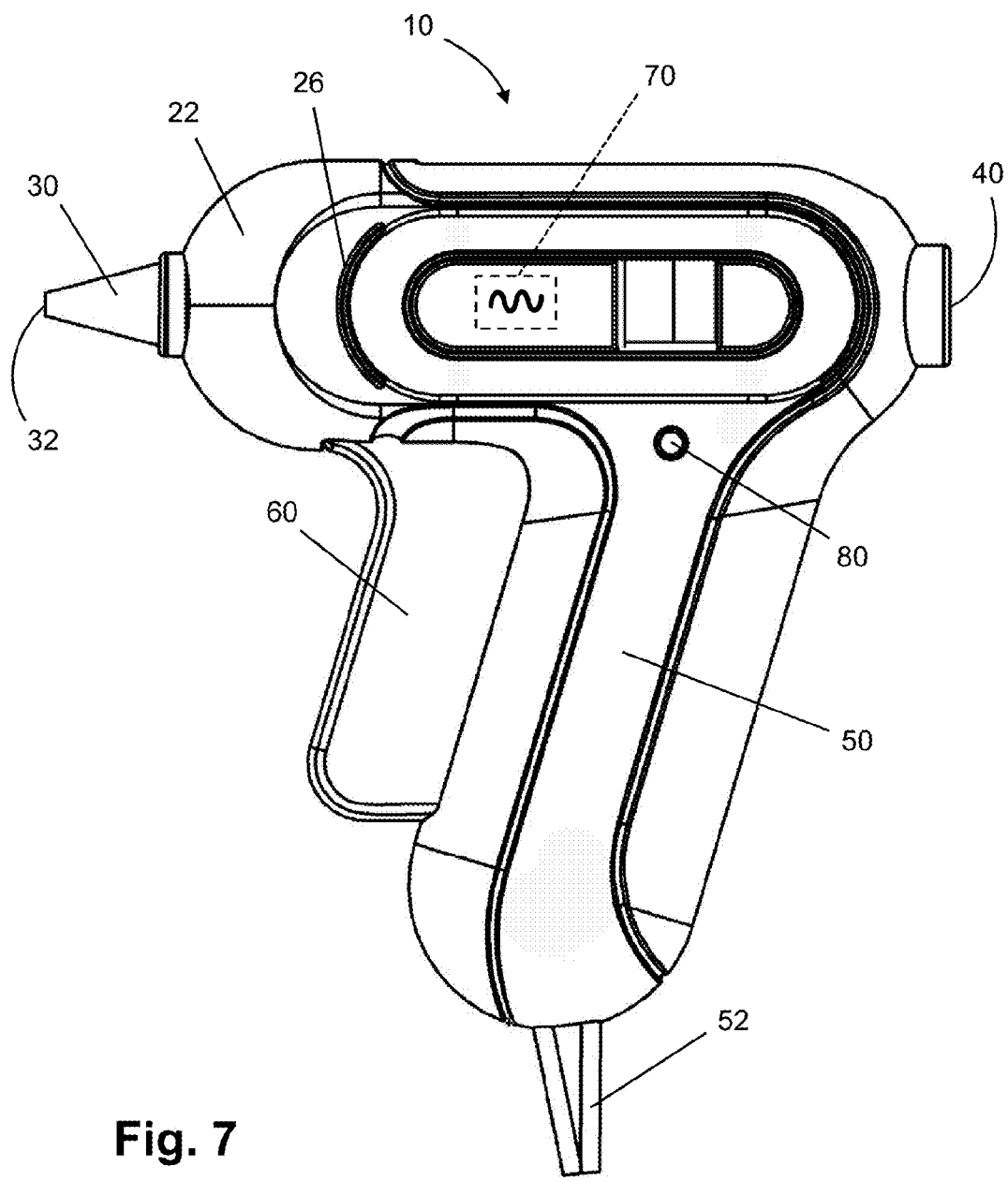
FIG. 7 is an enlarged side view, partially in schematic, of the glue gun of FIG. 1.

With reference to the drawings wherein like numerals represent like parts throughout the figures, a representative glue gun which incorporates a dispensing nozzle indicator is generally designated by the numeral 10. Glue gun 10 functions to receive a glue stick (not illustrated). The glue stick is heated until a sufficient temperature is reached to melt a portion of the stick and provide molten glue for dispensing through a nozzle tip. Glue gun 10 is illustrated for purposes of describing a dispensing nozzle tip indicator. It should be understood, however, that numerous glue gun embodiments may incorporate a dispensing nozzle indicator with the features described herein.

Glue gun 10 comprises a main body 20 formed of heavy duty plastic. The main body 20 forms an upper contoured housing 22 which generally defines a central longitudinal axis A. The housing 22 mounts a forward dispensing nozzle 30 communicating with a channel and a rearwardly positioned glue stick input opening or a receiver 40. In some embodiments, the top portion of the body defines a retaining recess 24 for receiving an extra glue stick. Protective shoulders 26 and 28 project from the opposed sides of the housing.

A handle 50 integrally projects from the underside of the housing 22 and is canted at an acute angle to the central longitudinal axis of the housing. A lower portion of the handle mounts a connector 52 for receiving an electrical cord (not illustrated). The connector 52 may be configured to audibly snap or make a clicking sound when the cord is fully received in the connector. The cord typically plugs into a household outlet (not illustrated).

The handle 50 further comprises forward and rearward textured plastic grip areas 54 and 56, respectively, which integrally extend upwardly in a contoured fashion into the exterior sides of the housing 22.

A depressible trigger 60 is disposed at the upper forward portion of the handle. The trigger 60 is manually depressible for mechanically advancing the glue stick and dispensing molten glue through the dispensing nozzle 30. The nozzle 30 is generally a conical structure with a central opening 32.

A heater 70 is disposed in the housing 22. The side of the glue gun 10 may include an LED light 80 generally disposed at the interface between the handle 50 and the housing 22. The LED light 80 emits a light to indicate that the heater is on. For some embodiments, the glue gun may include a button or switch for turning the heater on. Once turned on, the heater commences heating until a sufficient temperature is attained to melt the glue. Upon actuation of the trigger 60, the molten glue is dispensed through the dispensing nozzle 30.

With reference to FIGS. 8A-8D, the dispensing nozzle 30 is provided with a multi-layered coating which changes color in response to the temperature. In a cool-down status illustrated in FIG. 8A, the nozzle has a blue exterior color.

Figures 8A, 8B, 8C, 8D:
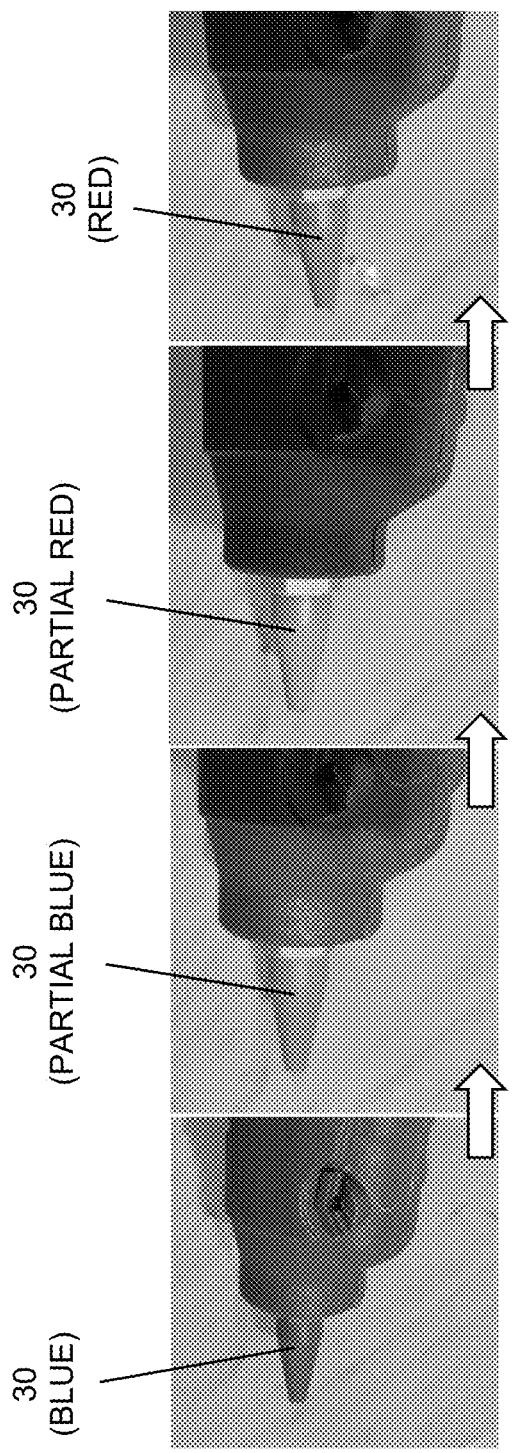
FIGS. 8A-8D are annotated schematic side views of the frontal side portion of the glue gun of FIG. 1 further illustrating the dispensing nozzle indicator function.

When the heater starts heating, the blue color begins to change color, as best illustrated in FIG. 8B.

As the temperature continues to rise, a red color begins to be revealed on the nozzle tip in the direction of the arrow, as illustrated in FIG. 8C.

When the transition temperature, which is sufficient to melt the glue and provide efficient dispensing through the nozzle 30 is reached or exceeded, the blue color of the nozzle has completely disappeared, and the nozzle 30 now has a color substantially completely covering same and entirely in the red range indicating that the desired temperature has now been reached for dispensing the glue, as illustrated in FIG. 8D.

In one embodiment which has a transition temperature of approximately 65° C., a red coating is first sprayed onto the nozzle and then baked at 120° C. for approximately 10 minutes. A blue coating is sprayed on top of the red coating. The dual coated layer is then baked in an oven at 120° C. for approximately 10 minutes. The dual coated nozzle is then baked at 180° C. for approximately 20 minutes. It will be appreciated that different color pigments may be selected depending on the transition temperature requirement. The coatings may also be applied to exteriorly visible structures of the gun in addition to or other than the nozzle.

In one embodiment, the transition temperature is approximately 65° C. When the temperature exceeds the 65° C. transition point, the nozzle 30 is substantially entirely red. It will be appreciated that as the nozzle 30 cools down upon deactivation of the heater, the nozzle will eventually assume an original color in the blue range, as illustrated in FIG. 8A.

Examples of technical specifications for embodiments of an inner red coating and an outer blue coating process for applying the coatings to the nozzle and which achieve the foregoing features are set forth in Tables I, II and III.

TABLE I

Ingredient list for Red Coating:

| S. NO | Material Name | Material Detail information | Range % | Exact % |
|---|---|---|---|---|
| 1 | Resin | Organic resin: Silicon Polyester resin | 30-35 | 32.41 |
| 2 | Pigment | Red: DPP Red 254 (Liwang Chemical, China) | 5-10 | 9.72 |
| 3 | Additives | Dispersing Agent: BYK 161 (BYK Chemicals, Germany) | 1-5 | 1.94 |
|   |   | Non Stick Additive  Silicon Oil: D-855 | 1-5 | 1.58 |
| 5 | Solvents | CAC, BCS, MEK | 50-55 | 54.35 |

Raw Material information:
1. Organic Resin: Silicon Polyester resin (% Solids = 60%, Silicon content = 50%)
2. Red Pigment: DPP Red 254, Organic Pigment.
3. Additive: Dispersing agent, BYK-161.
4. Additive: Silicon Oil, D-855 (low molecular weight silicon oil)
5. Solvent: CAC (Cellosolve Acetate/Ethylene Glycol Monoethyl ether acetate)
6. Solvent: BCS (Butyle Cellosolve/Ethylene Glycol monobutyl ether)
7. Solvent: MEK(Methyl Ethyl Ketone)

TABLE II

Ingredient list for Blue Coating:

| S. NO | Material Name | Material Detail information | Range % | Exact % |
|---|---|---|---|---|
| 1 | Resin | Organic resin: Silicon Polyester resin | 45-50 | 47.35 |
| 2 | Pigment | Blue: Thermo chromic pigment (70° C.) (inorganic pigment) | 10-15 | 13.93 |
| 3 | Additives | Non Stick Additive  Silicon Oil: D-855 | 1-3 | 0.93 |
| 4 | Solvents | CAC, BCS, MEK | 35-40 | 37.79 |

Raw Material information:
1. Organic Resin: Silicon Polyester resin (% Solids = 60%, Silicon content = 50%)
2. Blue Pigment: Thermo chromic pigment blue, Inorganic Pigment.
3. Additive: Silicon Oil, D-855 (low molecular weight silicon oil)
4. Solvent: CAC (Cellosolve Acetate/Ethylene Glycol Monoethyl ether acetate)
5. Solvent: BCS (Butyle Cellosolve/Ethylene Glycol monobutyl ether)
6. Solvent: MEK(Methyl Ethyl Ketone)

TABLE III

Coating Application procedure:

1. Before spraying, mix liquid coating for 10-15 minutes.
2. Filter the coating using filter cloth (≥200 #).
3. Sand blasting nozzle substrate (100 # sand)
4. Spray the red coating with clean spray gun under clean environment
5. Bake coating: 120° C./10-15 mins
6. Cool coating down and then spray blue coating on it.
7. Bake coating: 120° C./10-15 mins & then 180° C./20 mins Naturally, the specific colors for the change may be colors other than blue and red. The transition temperatures for initiating the dispensing nozzle color change may range from 20° C. to 100° C., but typically range from 30° C. to 70° C.

It will be appreciated that the color change will provide a very effective and efficient means for indicating when the proper temperature for operating the glue gun has been reached.

While preferred embodiments of the foregoing glue gun indicator have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A glue gun for dispensing glue comprising:
a body having a receiver and a dispensing nozzle having an exterior surface;
a heater disposed in said body and operable to heat glue to an operating temperature above a transition temperature sufficient for dispensing molten glue through said nozzle;
wherein said nozzle is coated with a temperature dependent color changing pigment and exhibits a first color covering said exterior surface when the operating temperature is below the transition temperature and changes to and exhibits a second color covering said exterior surface when said transition temperature is exceeded.

2. The glue gun of claim 1 wherein said first color is in the blue range and the second color is in the red range.

3. The glue gun of claim 1 wherein said nozzle changes back to said first color when said operating temperature decreases from greater than said transition temperature to less than said transition temperature.

4. The glue gun of claim 1 wherein the nozzle has a first coating with a pigment having the second color and an outer second coating with a pigment having the first color.

5. The glue gun of claim 1 wherein the transition temperature is in the range from 20° C. to 100° C.

6. The glue gun of claim 1 wherein the transition temperature is in the range of 30° C. to 70° C.

7. The glue gun of claim 1 wherein the transition temperature is approximately 65° C.

8. A glue gun for dispensing glue comprising:
a body having a receiver for receiving a glue stick at a first end and a dispensing nozzle assembly comprising a nozzle exterior surface at a second end;
a heater disposed in said body and operable to heat a glue stick to an operating temperature above a transition temperature sufficient for dispensing molten glue through a nozzle;
wherein said nozzle exterior surface exhibits a first color covering said exterior surface when the operating temperature is below the transition temperature and changes to a second color covering said exterior surface when said transition temperature is exceeded and wherein the nozzle exterior surface has a first coating with a pigment having the second color and an outer second coating with a pigment having the first color.

9. The glue gun of claim 8 wherein said first color is in the blue range and the second color is in the red range.

10. The glue gun of claim 8 wherein said nozzle exterior surface changes back to said first color when said operating temperature decreases from greater than said transition temperature to less than said transition temperature.

11. The glue gun of claim 8 wherein the transition temperature is in the range of 30° C. to 70° C.

12. The glue gun of claim 8 wherein the transition temperature is approximately 65° C.

13. A glue gun for dispensing glue comprising:
a body defining a longitudinal axis and having a receiver and a dispensing nozzle axially symmetric about said axis;
a heater disposed in said body and operable to heat glue to an operating temperature above a transition temperature for dispensing glue through said nozzle; and
an exteriorly visible temperature indicator comprising a pigment coating completely covering said nozzle;
wherein said temperature indicator exhibits a first color below the transition temperature and exhibits a second color when said transition temperature is exceeded.

14. The glue gun of claim 13 wherein said first color is in the blue range and the second color is in the red range.

15. The glue gun of claim 13 wherein said temperature indicator exhibits said first color when said operating temperature decreases from greater than said transition temperature to less than said transition temperature.

16. The glue gun of claim 13 wherein the temperature indicator has a surface having a first coating with a pigment having the second color and an outer second coating with a pigment having the first color.

17. The glue gun of claim 13 wherein the transition temperature is in the range of 30° C. to 70° C.

18. The glue gun of claim 13 wherein the temperature indicator comprises a temperature dependent color changing pigment.

19. A glue gun for dispensing glue comprising:
a body having a receiver and a dispensing nozzle having an exterior surface coated with a temperature dependent color changing pigment;
a heater disposed in said body and operable to heat glue to an operating temperature above a transition temperature sufficient for dispensing molten glue through said nozzle;
wherein said nozzle exhibits a first color covering said exterior surface when the operating temperature is below the transition temperature and changes to and exhibits a second color covering said exterior surface when said transition temperature is exceeded and wherein the nozzle has a first coating with a pigment having the second color and an outer second coating with a pigment having the first color.

20. The glue gun of claim 19 wherein the nozzle is coated with a temperature dependent color changing pigment.

* * * * *